(12) United States Patent
Shigeeda

(10) Patent No.: US 8,547,570 B2
(45) Date of Patent: Oct. 1, 2013

(54) IMAGE PROCESSING SYSTEM AND ACCESS CONTROL INFORMATION REGISTRATION METHOD OF FUNCTION ACCESS CONTROL

(75) Inventor: Nobuyuki Shigeeda, Kawasaki (JP)

(73) Assignee: Canon Kabushiki Kaisha (JP)

( * ) Notice: Subject to any disclaimer, the term of this patent is extended or adjusted under 35 U.S.C. 154(b) by 1587 days.

(21) Appl. No.: 11/622,243

(22) Filed: Jan. 11, 2007

(65) Prior Publication Data

US 2007/0171466 A1   Jul. 26, 2007

(30) Foreign Application Priority Data

Jan. 24, 2006 (JP) ................. 2006-015491

(51) Int. Cl.
*G06F 3/12* (2006.01)
*G06F 15/00* (2006.01)
*G06K 1/00* (2006.01)

(52) U.S. Cl.
USPC .......................... 358/1.15; 358/1.9

(58) Field of Classification Search
None
See application file for complete search history.

(56) References Cited

U.S. PATENT DOCUMENTS

| 6,519,640 | B2 * | 2/2003 | Hattori et al. ............. 709/224 |
| 2001/0050782 | A1 * | 12/2001 | Niitsuma et al. ............. 358/1.15 |
| 2002/0015180 | A1 * | 2/2002 | Tominaga .................... 358/1.15 |
| 2002/0041386 | A1 * | 4/2002 | Suzuki et al. .............. 358/1.13 |
| 2002/0049837 | A1 * | 4/2002 | Kato ........................... 709/223 |
| 2002/0147798 | A1 * | 10/2002 | Huang ......................... 709/220 |
| 2004/0064785 | A1 * | 4/2004 | Sasaki et al. ................. 715/500 |
| 2004/0128532 | A1 | 7/2004 | Ohishi et al. |
| 2006/0203279 | A1 * | 9/2006 | Kinoshita .................... 358/1.14 |
| 2006/0232795 | A1 * | 10/2006 | Tsuboi et al. ................. 358/1.2 |

FOREIGN PATENT DOCUMENTS

| JP | 6-315059 A | 11/1994 |
| JP | 2001-092760 A | 4/2001 |
| JP | 2002-202945 A | 7/2002 |
| JP | 2004-021554 A | 1/2004 |
| JP | 2004-129247 A | 4/2004 |
| JP | 2004-135195 A | 4/2004 |
| JP | 2004-152263 A | 5/2004 |

* cited by examiner

*Primary Examiner* — Ming Hon

(74) *Attorney, Agent, or Firm* — Rossi, Kimms & McDowell LLP

(57) ABSTRACT

When an image processing apparatus is newly installed, an access control request is issued from the image processing apparatus to a control apparatus at step S302. Then at step S303, regarding the image processing apparatus that has issued the access control request, an access control table to control access to functions of the image processing apparatus is automatically generated and registered in the control apparatus. In the control apparatus, access control is managed for each function of the image processing apparatus based on the registered access control table.

12 Claims, 6 Drawing Sheets

IMAGE PROCESSING SYSTEM AND ACCESS CONTROL INFORMATION REGISTRATION METHOD OF FUNCTION ACCESS CONTROL

BACKGROUND OF THE INVENTION

1. Field of the Invention

The present invention relates to an image processing system and its management method, and more particularly, to a management method in an image processing system, where an image processing apparatus and a control apparatus are connected, for management of access control to the image processing apparatus by the control apparatus.

2. Description of the Related Art

Today, a system where image processing apparatuses such as a printer, a scanner, a facsimile machine, a copy machine and a multi-function peripheral device having functions of these machines are connected to a personal computer (PC) via a network or the like is widely used. In such a system, jobs executed within the image processing apparatuses or execution-suspended jobs can be managed by the PC. In addition, the restriction to use of functions of the image processing apparatuses can be performed by the PC.

Further, it may be arranged such that the plural image processing apparatuses are connected to a directory server via a network, and jobs in the image processing apparatuses are managed in an integrated manner by using an access control ticket or the like (for example, see Japanese Patent Application Laid-Open No. 2002-202945).

Further, it may be arranged such that a security attribute database is provided within a server, and a document printing apparatus which has accessed the server via the network controls print execution/nonexecution based on the attributes of a document file registered in the database (for example, see Japanese Patent Application Laid-Open No. 2004-152263).

To perform job management on connected image processing apparatuses using the above-described PC, the directory server, the server with a security attribute database or the like, it is necessary to register in advance the image processing apparatuses as the subjects of management into the server or the like. For example, it is necessary for a system administrator to manually register attribute information, functions and the like of the image processing apparatuses as the subjects of management into the PC, the server or the like.

For example, to restrict availability of the functions of image processing apparatuses using an access control ticket, it is necessary to set initial authority in advance on the directory server by manually generating authorizing information regarding the functions specific to the respective image processing apparatuses. Each of the image processing apparatuses may have different functions, and further, the functions may differ depending on apparatus configuration. Accordingly, it is necessary for the system administrator to manually generate and set the authorizing information on the directory server in accordance with the different functions.

Meanwhile, in order to safely deliver and register security information etc. for security setting of information device to a device management apparatus that manages the information deice, a method for mutual authentication utilizing a public key cryptosystem is known (for example, see Japanese Patent Application Laid-Open No. 2004-135195).

As described above, in the conventional image processing systems, to perform job management and function availability restriction in an integrated manner in addition to user authentication using the directory server, the access control ticket or the like, the following operations are required. That is, it is necessary to generate and set information on the functions of the image processing apparatus as the subjects of management and authority setting information (access control information) for use of the functions, in the directory server or the like for management of image processing apparatuses.

However, regarding such access control information, it is impossible for the directory server to obtain the function information of the image processing apparatuses and values of the function authority settings in advance. Accordingly, it is necessary for the administrator of the image processing apparatuses (system administrator) to set values of such access control information in advance by manually generating and registering the information upon installation of the image processing apparatuses.

Therefore, when the installation of the image processing apparatuses has been completed, the system administrator is required to log in to the directory server, and generate and set access control information with referring to management guidance (administrator manual) or the like. Further, as the respective image processing apparatuses are likely to have different functions and apparatus configurations, the system administrator needs to repeatedly perform generation and setting of access control information for each image processing apparatus. Accordingly, each time a new image processing apparatus is installed, the system administrator has to go through this very complicated procedure.

Further, according to the method disclosed in Japanese Patent Application Laid-Open No. 2004-135195, although device information can be automatically registered in a device management apparatus, access control information of the image processing apparatuses cannot be automatically registered. This is because initial values of authority that is a base of access control information (access authority) cannot be automatically set.

Accordingly, in this prior art, for setting of access authority initial values, the system administrator is required to log in to the device management apparatus and set access control information for each image processing apparatus. That is, the system administrator is compelled to perform this troublesome operation.

The present invention has been made to address the above-described problems individually or at once, and it is a feature to realize the following control in an image processing system for management of access control to functions of the image processing apparatuses by a control apparatus. That is, the present invention has a feature to provide an image processing system and its management method for automatic setting of access control information in the control apparatus upon installation of a new image processing apparatus.

SUMMARY OF THE INVENTION

According to an aspect of the present invention, there is provided a management method of an image processing system in which at least one image processing apparatus is connected to a control apparatus via a network, for managing, in the image processing system, access control to the image processing apparatus by the control apparatus, the method comprising:

a control request step of, when the image processing apparatus is newly connected to the network, issuing an access control request to the control apparatus from the image processing apparatus; and a table registration step of, regarding the image processing apparatus which has issued the access control request, generating an access control table to control access to functions of the image processing apparatus and registering the access control table, in the control apparatus, wherein in the control apparatus, the access control is managed for each function of the image processing apparatus which has issued the access control request based on the access control table registered at the table registration step.

According to another aspect of the present invention, there is provided an image processing system in which at least one image processing apparatus is connected to a control apparatus via a network, for managing access control to the image processing apparatus by the control apparatus, wherein the image processing apparatus comprises:
a control request unit adapted to, when the image processing apparatus is newly connected to the network, issue an access control request to the control apparatus,
and wherein the control apparatus comprises:
a table registration unit adapted to, regarding the image processing apparatus which has issued the access control request, generate an access control table to control access to functions of the image processing apparatus and register the access control table; and
an access management unit adapted to manage the access control for each function of the image processing apparatus which has issued the access control request based on the access control table registered by the table registration unit.

According to another aspect of the present invention, there is provided an image processing apparatus in which access control is managed by a control apparatus connected to the image processing apparatus via a network, comprising:
a command issuance unit adapted to issue an access control request command when the image processing apparatus is newly connected to the network;
an attribute information acquisition unit adapted to acquire attribute information of the image processing apparatus;
a command notification unit adapted to notify the control apparatus of the access control request command and the attribute information; and
an informing unit adapted to receive a response to the access control request command from the control apparatus and inform the contents of the response.

According to another aspect of the present invention, there is provided a control apparatus, connected to at least one image processing apparatus via a network, for managing access control to the image processing apparatus based on an access control table, comprising:
a template holding unit adapted to hold plural templates describing information concerning initial values of the access control table;
a template selection unit adapted to select one of the plural templates based on an attribute of a newly-connected image processing apparatus; and
a table registration unit adapted to generate the access control table based on the attribute of the newly-connected image processing apparatus and the template selected by the template selection unit and register the access control table,
wherein the access control is managed for each function of the image processing apparatus based on the access control table registered by the table registration unit.

Further features of the present invention will become apparent from the following description of exemplary embodiments with reference to the attached drawings.

DESCRIPTION OF THE EMBODIMENTS

Hereinafter, with reference to the accompanying drawings, the present invention will be described in detail in association with preferred embodiments. Note that the arrangements shown in the following embodiments are merely examples, and the present invention is not limited to the shown arrangement.

First Embodiment

<System Configuration>

Figure 1:
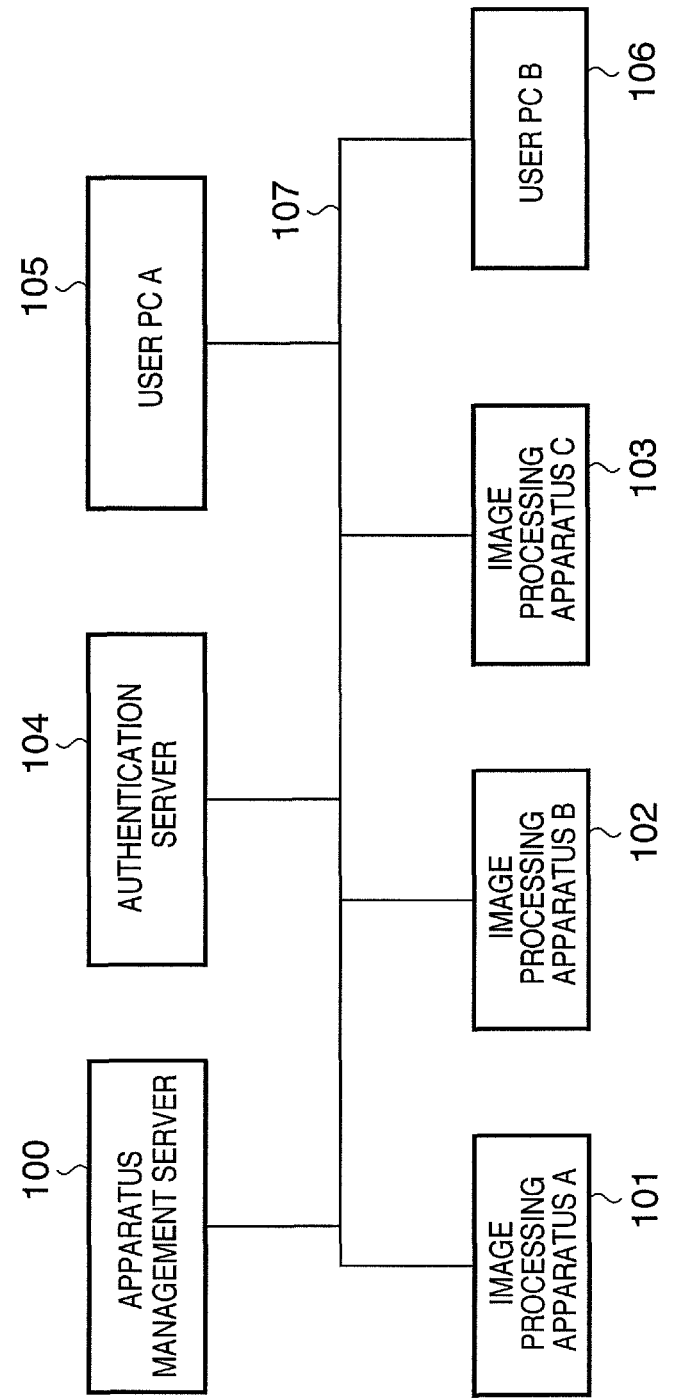
FIG. 1 is a block diagram showing the entire configuration of an image processing system according to an embodiment of the present invention.

FIG. 1 is a block diagram showing the configuration of an image processing system as an embodiment of the present invention. An apparatus management server 100 according to the present embodiment, which is connected to a network 107 such as an office LAN, holds an access control table for image processing apparatuses as the subjects of management. In the system, three image processing apparatuses, i.e., an image processing apparatus A 101, an image processing apparatus B 102 and an image processing apparatus C 103 are connected to the network 107. The functions of the respective image processing apparatuses A to C (101 to 103) are controlled using the access control table held in the apparatus management server 100.

An authentication server 104, which is also connected to the network 107, performs identification and verification, i.e., user authentication in the image processing apparatuses A to C (101 to 103). A user inputs e.g. a user name and a password, on an image processing apparatus, and the authentication server 104 performs user authentication in the image processing apparatus based on the input user name and password.

The apparatus management server 100 refers to the access control table based on the user name specified as a result of the user authentication and information on the image processing apparatus to be used by the user, then generates an access ticket for the image processing apparatus, and returns the ticket to the image processing apparatus. The image processing apparatus receives the access ticket, refers to the access ticket, and controls permission/non-permission of operation (use of function) by the authenticated user.

Meanwhile, a user PC A 105, which is also connected to the network 107, is used for user's work, and further, realizes network printing by inserting a print job into the respective image processing apparatuses A to C (101 to 103) via the network 107. Note that a system administrator who administrates the entire system can also manage the apparatus management server 100 and the image processing apparatuses A to C (101 to 103) from the user PC A 105 or a user PC B 106 via the network 107.

Next, the configuration of the image processing apparatus A 101 will be described. Note that as the image processing apparatus B 102 and the image processing apparatus C 103 may have the same configuration as that of the image processing apparatus A 101, the explanation of the constructions of the image processing apparatuses B and C will be omitted.

Figure 2:
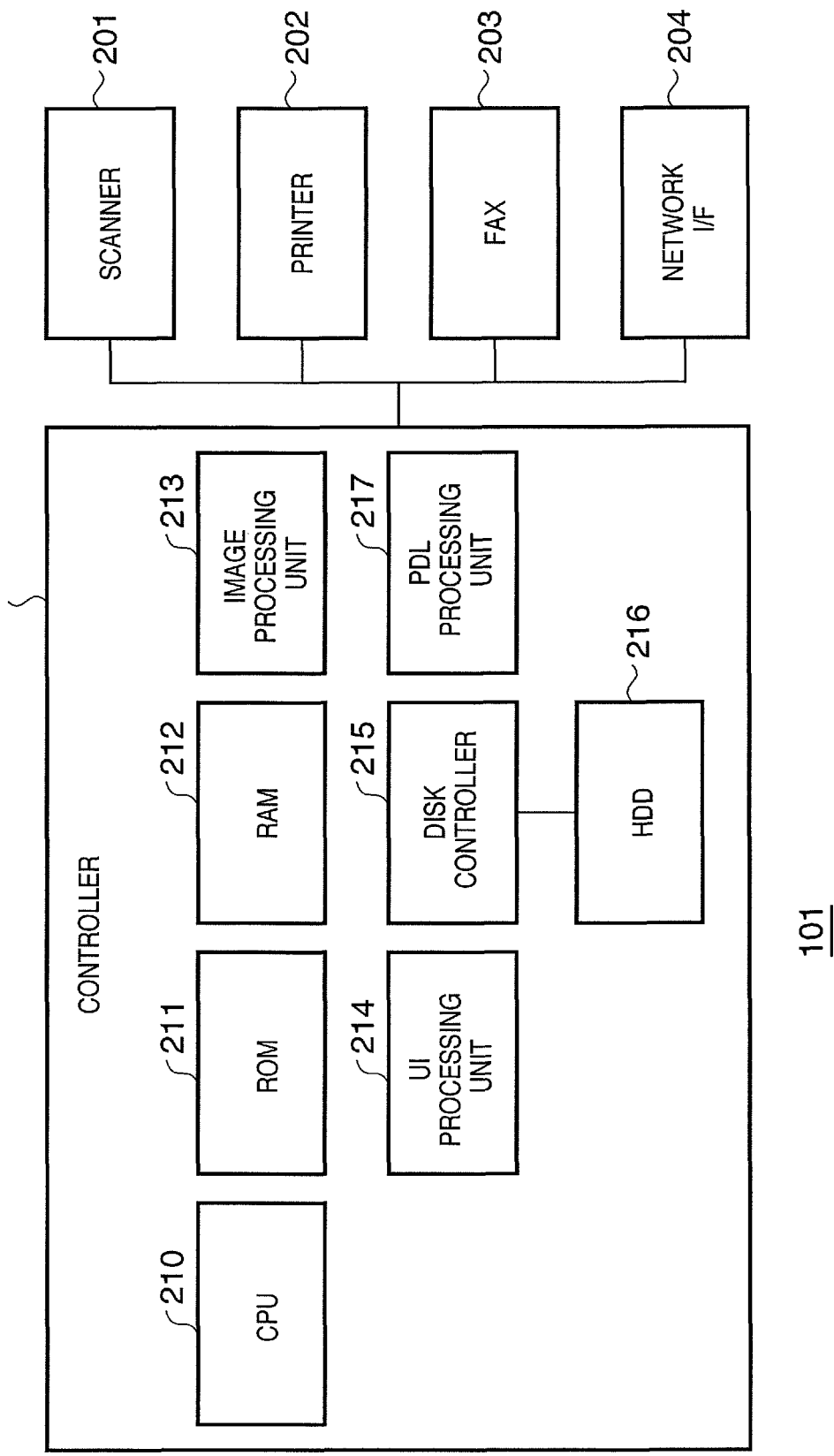
FIG. 2 is a block diagram showing the configuration of an image processing apparatus according to the embodiment.

FIG. 2 is a block diagram showing the configuration of the image processing apparatus A 101. In the present embodiment, as the image processing apparatus A 101, a multi-function peripheral (MFP) having a scanner function, a printer function, and a facsimile (FAX) function will be used. Note that a single-function network device such as a network printer or a network scanner other than the MFP as shown in FIG. 2 may be used as the image processing apparatus A 101.

The image processing apparatus A 101 as an MFP (hereinafter simply referred to as an "image processing apparatus") as shown in FIG. 2 generally includes a controller 200, a scanner 201, a printer 202, a FAX 203 and a network interface (I/F) 204. These units are interconnected by a local connection interface of the image processing apparatus, and perform the functions of the MFP as a whole.

The scanner 201 provides the function of a scanner including a document feeder. The printer 202 provides the function of a printer including a finisher. Further, the FAX 203 which provides an Internet facsimile transmission/reception processing and a general telephone line (G3/G4) facsimile function, includes a network control unit for connection to a telephone line. The network I/F 204, which establishes connection to a LAN conforming to the Ethernet (registered trademark) standards, provides a network communication function such as TCP/IP.

The controller 200 controls the respective functions of the scanner 201, the printer 202, the FAX 203 and the network I/F 204 in an integrated manner. By this integrated control, the entire MFP provides e.g. a copy machine function, and advanced value-added functions such as a so-called Send function where, for example, E-mail transmission of a scanned document via a network is performed.

The main functions of the MFP are the copy machine function, the Send function, a network printer function, a G3/G4-FAX function, an Internet FAX function and the like. Further, the MFP has a BOX function of storing a scanned image and print data (PDL) in an HDD 216 for management of images arranged in folders for improvement of convenience.

Further, to prevent unauthorized duplication or use of the Send function regarding confidential documents handled within a company or the like, the MFP has a user authentication function of identifying and verifying a user of an image processing apparatus. That is, the user performs user authentication via an operation panel prior to the use of the image processing apparatus. Only an authenticated user can utilize the respective functions of the MFP.

As detailed constituents (components) of the controller 200 to control the various functions of the image processing apparatus, a CPU 210 serves as primary hardware for integrative control of the respective functions of the image processing apparatus. On the other hand, software (controller software) for the integrated control of the respective functions of the image processing apparatus is held in the HDD 216 when the power source is OFF, and when the power source is turned ON, its control code is loaded to a RAM 212 that serves as a work memory.

A ROM 211, which is used for storage of information to be held even when the power source is OFF, is a nonvolatile memory such as a flash memory. In addition, basic processing from loading of the control code of the controller 200 immediately after the power-on to the start of operation is executed by using a starting code previously stored in the ROM 211.

A disk controller 215 handles basic interface processing with respect to the HDD 216. A PDL processing unit 217 maps print data described in page description language (PDL) to actual image data. An image processing unit 213 is a specialized high-speed processing unit for various image processing. A UI processing unit 214, including an operation panel (not shown) of the image processing apparatus, receives a user's instruction, and is also used for display of information for the user. Accordingly, the operation panel is provided with an LCD (liquid crystal display) panel, physical buttons and the like for display and input of information.

In the image processing system according to the present embodiment, for the purpose of security against information leakage and management cost reduction, an authenticated user is permitted to use various functions of the MFP within the given range of authorization assigned to each user. The respective functions of the image processing apparatus shown in FIG. 2 are managed by the apparatus management server 100 shown in FIG. 1, and operation authorizing information for each function is held in the access control table held on the apparatus management server 100. As the setting of the access control table is different for each image processing apparatus, it is generated, set and held for each image processing apparatus.

Accordingly, to add an image processing apparatus having the above configuration to the image processing system, in addition to installation procedure for the new image processing apparatus, a series of procedure of generation, setting and registration of the access control table in the apparatus management server 100 is also required, since as described above, it is required that the access control table is generated and held for each image processing apparatuses.

The image processing apparatus shown in FIG. 2 has functions upon new installation, and these functions are installed in the above-described controller software in advance. On the other hand, the apparatus management server 100 performs the series of processing of generation, setting and registration of an access control table upon communication from the newly-installed image processing apparatus. These processings in the apparatus management server 100 are performed based on the control code installed in the software constructing the apparatus management server 100.

<New Installation Processing for Image Processing Apparatus>

In the image processing system according to the present embodiment, when an image processing apparatus having the configuration as shown in FIG. 2 is added, the system administrator instructs to perform new installation process via the operation panel of the image processing apparatus. Examples of the new installation process are as follows. That is, network setting such as assignment of a TCP/IP address and the like for connecting the image processing apparatus to the network 107, administrator password setting, authentication server address setting, generation and setting of access control table for the apparatus management server 100, and so on.

Hereinafter, the series of processing of generation, setting and registration of an access control table upon new registration of an image processing apparatus will be described with reference to the flowcharts of FIGS. 3 and 4.

Figure 3:
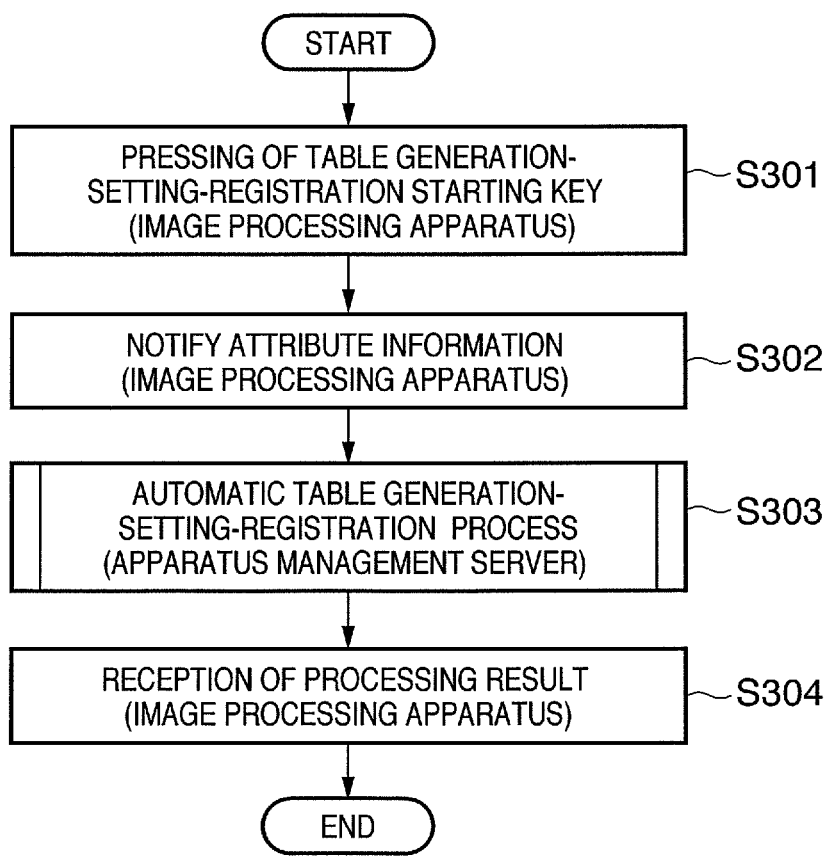
FIG. 3 is a flowchart showing access control table registration processing according to the embodiment.

FIG. 3 is a flowchart showing access control table registration process performed upon new installation of an image processing apparatus in the image processing system according to the present embodiment for the purpose of management of the image processing apparatus. In this figure, steps S301, S302 and S304 are performed by the image processing apparatus (101 to 103), and step S303, by the apparatus management server 100.

First, at step S301, the system administrator presses a table generation-setting-registration start key on the operation panel of the image processing apparatus, and the image processing apparatus receives the pressing of the key. The table generation-setting-registration start key is a logical key displayed on the LCD or the like of the operation panel. When this key is pressed, execution of access control table generation and setting process for the apparatus management server 100 is instructed.

Next, at step S302, the image processing apparatus collects apparatus attribute information such as functions, configuration and the like and notifies the apparatus management server 100 of the information. As described above, as the functions of the image processing apparatus, the copy machine function, the printer function, the FAX function, the BOX function, the Send function and the like are provided. Further, as the configuration information, color/monochrome in the image processing apparatus, a finishing function, equipped options and the like are obtained. The image processing apparatus notifies the apparatus management server 100 of these attribute information via the network 107 in accordance with a command to start the access control table generation-setting-registration process for the image processing apparatus. By this command, a request for generation, setting and registration of access control table for the image processing apparatus is issued to the apparatus management server 100. Note that in the newly-installed image processing apparatus, the network address of the apparatus management server 100 is set in advance. Otherwise, it may be arranged such that, upon new installation, the image processing apparatus broadcasts a particular packet on the network 107 and searches for the apparatus management server 100 by detecting a response to the packet. Otherwise, the system administrator may input the network address of the apparatus management server 100 via the operation panel of the image processing apparatus.

Then at step S303, the apparatus management server 100 receives the command and attribute information from the image processing apparatus, and performs automatic access control table generation-setting-registration process at a predetermined address. When the registration of the access control table has been completed, the apparatus management server 100 returns the result of the series of processes as a response to the above command to the image processing apparatus. Note that the details of the table generation-setting-registration process will be described later with reference to FIG. 4.

At step S304, the image processing apparatus displays the contents of processing result received from the apparatus management server 100 on the LCD to notify the system administrator of the contents of the processing result. As the contents displayed on the LCD, success/failure of access control table registration or the contents themselves of the table may be displayed.

<Access Control Table Registration Processing>

Hereinafter, the access control table generation-setting-registration process in the apparatus management server 100 at the above-described step S303 will be described in detail with reference to the flowchart of FIG. 4. As described above, the generation, setting and registration of access control table in the apparatus management server 100 are performed based on the control code that is implemented in the software constructing the apparatus management server 100 in advance.

First, at step S401, the reception of the table generation-setting-registration process starting command and the apparatus attribute information is detected (detection step). The detection step is implemented in the command reception process via network in the apparatus management server 100. When the reception of the table generation-setting-registration process starting command and the apparatus attribute information have been detected, the process proceeds to step S402.

At step S402, an access authority template is selected. The access authority template provides initial values of the access control table regarding the newly installed image processing apparatus. The access authority template is generated by the system administrator and held in the apparatus management server 100 in advance. In the present embodiment, the access authority templates are defined in correspondence with the type, configuration and the like of image processing apparatus. For example, a template for an MFP having a color printer function, a template for an MFP having a BOX function, a template for an MFP having a Send function and the like are prepared in advance.

The process operating on the apparatus management server 100 selects an appropriate access authority template based on the attribute information notified from the image processing apparatus. The attribute information notified from the image processing apparatus includes an apparatus model, apparatus configuration information i.e., existence/absence of a finisher option, and the like. The apparatus management server 100 determines a template to be selected as initial values of access control table based on the attribute information.

Next, at step S403, an access control table to hold the access authority to the functions of the newly-installed image processing apparatus is generated at a predetermined address based on the attribute information notified from the image processing apparatus. As operation authority is described in the access control table in accordance with the functions and configuration of image processing apparatus, it is necessary for the apparatus management server 100 to generate, set and register an access control table for each image processing apparatus as the subject of management. Note that the details of the access control table will be described later.

Next, at step S404, the access authority template selected at step S402 is applied to the access control table generated at step S403. That is, at step S403 described above, the access control table is generated in accordance with the functions and configuration of image processing apparatus, but the initial values are not appropriately set. Accordingly, appropriate initial values corresponding to the type of image processing apparatus are set in the access control table using the access authority template selected at step S402. A particular example of application of initial values will be described later.

When the access control table has been normally generated and set by the above process and held in the apparatus management server 100, the apparatus management server 100 notifies the image processing apparatus of the result of the process at step S405. The image processing apparatus receives the notification as a response to the table generation-setting-registration process starting command, and displays the contents of the result on the operation panel. Upon display of the result, a series of the access control table generation-setting-registration process is completed.

As described above, according to the present embodiment, upon new installation of image processing apparatus, the series of the process regarding the generation, setting and registration of an access control table in the apparatus management server 100 can be completed only by the system administrator's instruction to execute the process from the image processing apparatus.

<Access Control Table Structure>

Figure 5:
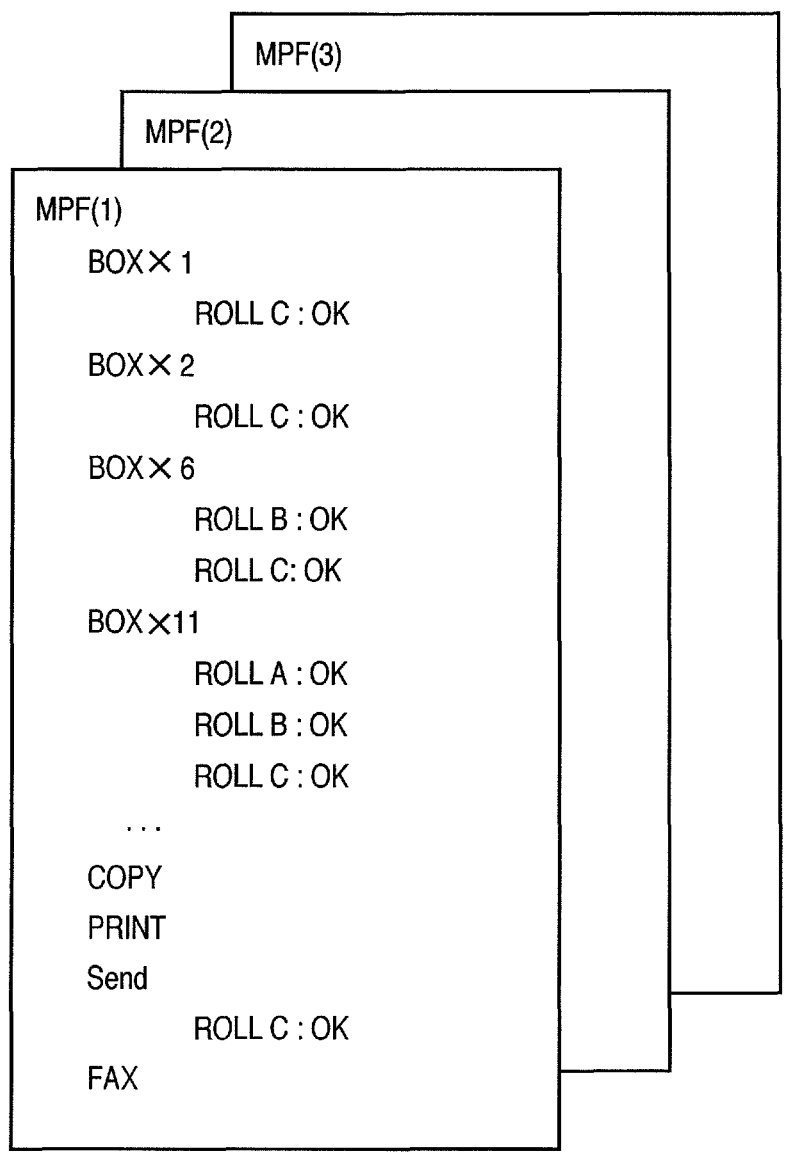
FIG. 5 is an example of the structure of the access control table according to the embodiment.

FIG. 5 shows an example of the structure of the access control table according to the embodiment. In FIG. 5, three types of tables, MFP (1), MFP (2) and MFP (3) corresponding to respective image processing apparatuses that have different functional constituents. In FIG. 5, the table of MFP (1) is configured so that the operation authority can be designated regarding BOX 1, BOX 2, BOX 6, BOX 11, copy, print, Send, and FAX functions. Note that regarding the BOX function, since plural folders (BOX), which can be respectively access-controlled, exist in the HDD 216, the operation authority is set for the respective BOX functions in the table of MFP (1).

The operation authority is designated based on the "roll" for the respective functions. For example, roll setting based on user category such as "user", "operator" and "system administrator", or roll setting based on corporate structure such as "general", "section chief" and "division chief" may be made. In the present embodiment, it is assumed that three types of rolls, roll A, roll B and roll C can be set.

In FIG. 5, it is shown that only the roll C is accessible to the BOX 1 and BOX 2 functions of the MFP (1). Further, regarding the BOX 6 function, the roll B and the roll C are set as "access OK", and further, regarding the BOX 11 function, all the roll A, the roll 2 and the roll C are set as "access OK".

Note that when no access designation is made for a roll, it is interpreted that the setting is "access prohibited (or access permitted)", thereby the description of access control table can be simplified and the table capacity can be reduced.

To eliminate the need for reconstruction of access control table in accordance with change (addition, deletion and/or change) of user information, the roll-based designation is made in setting of access control table. In the present embodiment, the user information is held on the authentication server 104 shown in FIG. 1, and roll information allocated by user is described. When a user is specified by user authentication, a roll is uniquely determined in correspondence with the user.

Next, a particular example of access control will be described on the assumption that the table of MFP (1) corresponds to the image processing apparatus A 101 in FIG. 1.

When a user is to access the BOX 1 function on the image processing apparatus A 101, the image processing apparatus A 101 requests an access ticket to the BOX 1 function from the apparatus management server 100. Then the apparatus management server 100 generates an access ticket for the image processing apparatus A 101 and sends the ticket to the image processing apparatus A 101. The image processing apparatus A 101 receives and examines the ticket, and interprets that only the roll C is access-permitted as the access authority to the BOX 1 function.

At this time, as the user has already been passed through the user authentication upon use of the image processing apparatus A 101, the roll is known to the image processing apparatus A 101 as the result of specifying the user who logged in the image processing apparatus A 101. The image processing apparatus A 101 controls access to the BOX 1 function by the user based on the roll obtained in accordance with the user authentication and the contents of the access ticket to the BOX 1 function.

As the image processing apparatus A 101 have various functions such as copy, print, Send and FAX functions other than the BOX functions, the above-described respective access-control processes are performed with respect to the respective functions.

Access Authority Template Structure

Figure 6:
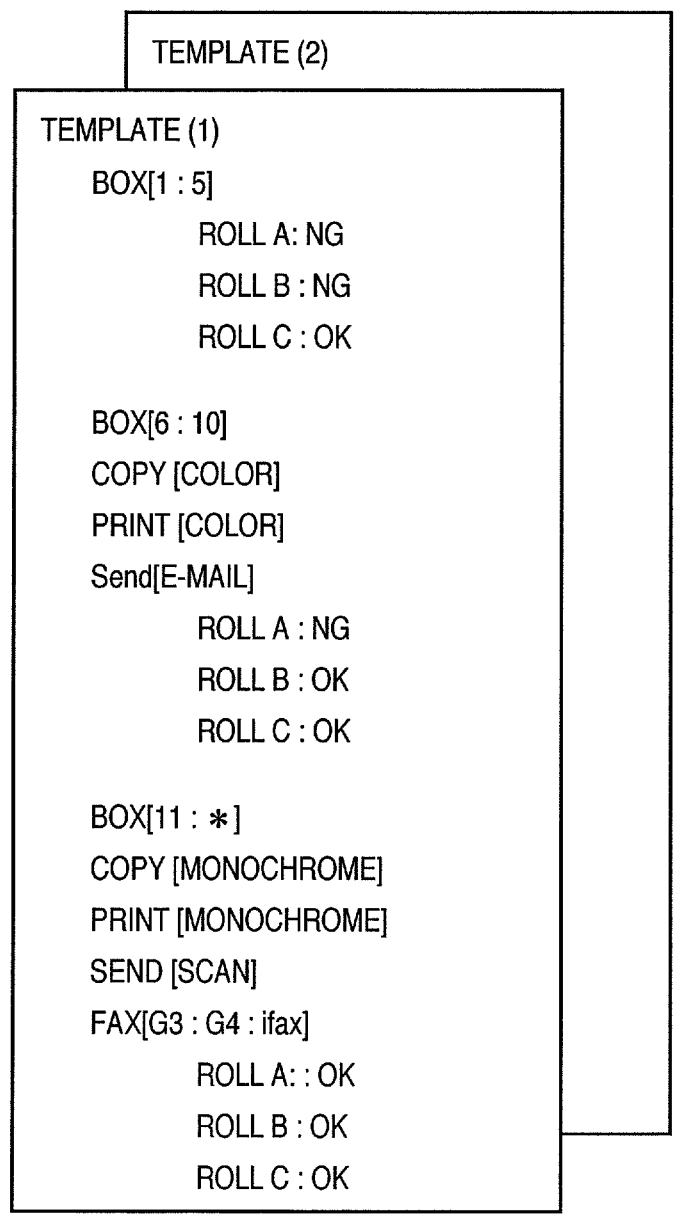
FIG. 6 is an example of the structure of the access authority template according to the embodiment.

FIG. 6 is an example of the structure of the access authority template (hereinafter, simply referred to as a "template") according to the present embodiment.

The template may be generated for each function category such as the MFP color/monochrome function, the FAX function and the Send function, or may be generated in correspondence with only one function (e.g., the printer function). In the present embodiment, the templates are generated and edited by the system administrator and held in the apparatus management server 100 in advance.

In FIG. 6, the template (1) and the template (2) are examples of templates for a color MFP and a monochrome MFP.

In the template (1), initial values of authority to access the BOX 1 to BOX 5 functions, authority to access the BOX 6 to BOX 10 functions, and authority to access the BOX 11 and subsequent functions are described. Further, initial values of authority to access the copy (color/monochrome) function, the print (color/monochrome) function, the Send (E-MAIL/scan) function, the FAX function and the like are described.

As shown in the example of the template (1), the initial values of authority to access the respective functions are described in the template based on the roll, the same as the case of the above-described access control table. For example, in the template (1), regarding the BOX 1 to 5 functions, the roll A and the roll B are set as access-prohibited but only the roll C is set as access-permitted. Further, regarding the BOX 6 to 10 functions, only the roll A is set as access-prohibited but the roll B and the roll C are set as access-permitted.

Figure 4:
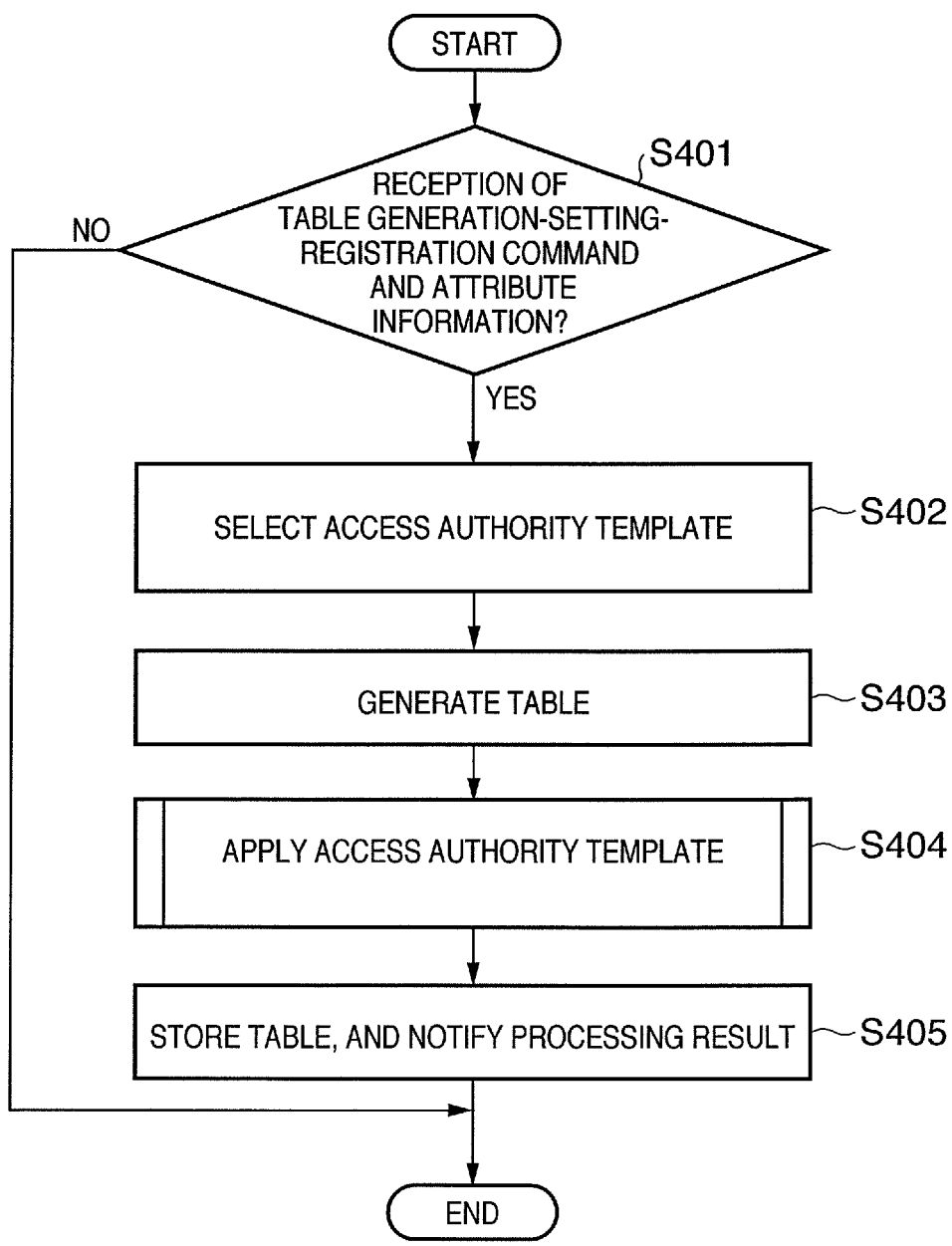
FIG. 4 is a flowchart showing access control table generation and registration processing according to the embodiment.

In the above-described table generation and setting processes shown in FIG. 4, at step S404 where the template is applied, the template shown in FIG. 6 is applied to the access control table shown in FIG. 5. That is, initial authority values described in the template are copied for each function in the access control table.

Note that the template shown in FIG. 6 is edited by the system administrator in advance. The apparatus management server 100 may be provided with a Web server function to remotely edit the template via the network utilizing a Web browser. Further, for enabling detailed editing, a specialized editing application to operate on the apparatus management server 100 may be prepared.

Further, at step S405 in FIG. 4, an access control table that has the initial values of the selected template is displayed on the operation panel of the image processing apparatus. Note that it may be arranged such that the system administrator can edit the contents of the displayed access control table using the operation panel. Then, the contents of the access control table edited in the image processing apparatus are notified to the apparatus management server 100. The apparatus management server 100 registers the access control table notified from the image processing apparatus. In this manner, the access control table can be customized in correspondence with each of image processing apparatuses.

In the present embodiment, as the template described above is prepared, when a new image processing apparatus is installed, an access control table is automatically generated, set and registered in the apparatus management server 100 through the respective processes shown in FIGS. 3 and 4. That is, upon installation of a new image processing apparatus, it is not necessary for the system administrator to access the apparatus management server 100 and perform complicated work to generate and set an access control table unique to the image processing apparatus. Thus the procedure upon installation of a new image processing apparatus can be simplified.

As described above, according to the present embodiment, when a new image processing apparatus is installed, the system administrator's labor to generate an access control table can be omitted. Accordingly, the present embodiment is especially advantageous when plural image processing apparatuses are to be newly installed, and the management cost can be reduced. Further, the occurrence of a security hole due to erroneous setting of an access control table by the system administrator's manual setting can be suppressed.

Other Embodiment

In addition to the above-described embodiment, the present invention can be implemented as a system, an apparatus, a method, a program or a storage medium (recording medium) and the like. More particularly, the present invention can be applied to a system constituted by a plurality of devices (e.g., a host computer, an interface device, an image sensing device and a web application) or to an apparatus comprising a single device.

Further, the object of the present invention can also be achieved by providing a software program for performing the functions of the above-described embodiment directly or remotely to a system or an apparatus, reading the program code with a computer of the system or apparatus, then executing the program. Note that in this case, the program corresponds to the flowcharts described in the above embodiment.

Accordingly, the program code installed in the computer to realize the functions according to the embodiment realizes the invention. That is, the present invention includes the computer program to realize the functional processing of the present invention.

In this case, as long as the system or apparatus has the functions of the program, the program may be executed in any form, such as an object code, a program executed by an interpreter, or script data supplied to an operating system.

Example of storage media that can be used for supplying the program are a floppy (registered trademark) disk, a hard disk, an optical disk, a magneto-optical disk, a CD-ROM, a CD-R, a CD-RW, a magnetic tape, a non-volatile type memory card, a ROM, and a DVD (a DVD-ROM and a DVD-R).

As for the method of supplying the program, a client computer can be connected to a website on the Internet using a browser of the client computer, and the computer program of the present invention (or an automatically-installable compressed file of the program) can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Besides the cases where the aforementioned functions according to the embodiments are implemented by executing the read program by computer, an operating system or the like running on the computer may perform all or a part of the actual processing so that the functions of the foregoing embodiment can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing in accordance with the designations of the program so that the functions of the foregoing embodiment can be implemented by this processing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-015491, filed on Jan. 24, 2006, which is hereby incorporated by reference herein in its entirety.

What is claimed is:

1. An access control information registration method in an image processing system in which at least one image processing apparatus is connected to a control apparatus via a network, said method comprising:

a request step of, when an image processing apparatus is newly connected to said network, transmitting, to said control apparatus from said newly-connected image processing apparatus, a registration request together with attribute information of the newly-connected image processing apparatus, the registration request being a request for registering with the control apparatus access control information for controlling access authority to functions of the newly-connected image processing apparatus; and a registration step of, in said control apparatus, regarding said image processing apparatus which has transmitted the registration request, selecting, based on the attribute information of the image processing apparatus transmitted therefrom, one of a plurality of templates, generating, based on the selected template, the access control information, and registering the access control information, the plurality of templates being held in the control apparatus in advance and each of them describing information to be used as initial values of the access control information, wherein in said control apparatus, the access control is managed for each function of said image processing apparatus which has transmitted the registration request based on the access control information registered at said registration step.

2. The method according to claim 1, wherein said request step comprises:

an instruction input step of inputting an instruction of said registration request based on a user's operation in said image processing apparatus;

an issuance step of issuing the registration request in accordance with the instruction inputted at said instruction input step; and an attribute information acquisition step of acquiring the attribute information of said image processing apparatus.

3. The method according to claim 1, wherein said attribute information indicates the functions of said image processing apparatus.

4. The method according to claim 1, wherein said attribute information indicates device configuration of said image processing apparatus.

5. The method according to claim 1, further comprising:

a registration result notification step of notifying said image processing apparatus of a result of processing at said registration step; and an informing step of informing contents of notification notified at said registration result notification step, in said image processing apparatus.

6. The method according to claim 1, further comprising:
a user authentication step of authenticating a user to use said image processing apparatus, in said image processing apparatus; and
a control information notification step of notifying said image processing apparatus of said access control information from said control apparatus,
wherein in said image processing apparatus, access control is performed for each function of said image processing apparatus based on an attribute of the user authenticated at said user authentication step and said access control information notified at said control information notification step.

7. The method according to claim 6, wherein in said access control information, access authority is set for each user attribute.

8. The method according to claim 7, wherein in said access control information, access authority is set for each attribute corresponding to said attribute information in said image processing apparatus.

9. The method according to claim 1, wherein in said template, access authority for each user attribute is described for each attribute which may appear in said image processing apparatus.

10. An image processing system in which at least one image processing apparatus is connected to a control apparatus via a network,
wherein said image processing apparatus comprises:
a request unit adapted to, when said image processing apparatus is newly connected to said network, transmit, to said control apparatus, a registration request together with attribute information of the newly-connected image processing apparatus, the registration request being a request for registering with the control apparatus access control information for controlling access authority to functions of the newly-connected image processing apparatus,
and wherein said control apparatus comprises:
a registration unit adapted to, regarding said image processing apparatus which has transmitted the registration request, select, based on the attribute information of the image processing apparatus transmitted therefrom, one of a plurality of templates, generate, based on the selected template, the access control information, and register the access control information, the plurality of templates being held in the control apparatus in advance and each of them describing information to be used as initial values of the access control information; and
an access management unit adapted to manage the access control for each function of said image processing apparatus which has transmitted the registration request based on the access control information registered by said registration unit.

11. The image processing system according to claim 10, wherein said request unit in said image processing apparatus comprises:
an instruction input unit adapted to input an instruction of said registration request based on a user's operation;
a issuance unit adapted to issue the registration request in accordance with the instruction inputted by said instruction input unit; and
an attribute information acquisition unit adapted to acquire the attribute information of said image processing apparatus.

12. The image processing system according to claim 10, wherein said access management unit in said control apparatus notifies said image processing apparatus of said access control information,
and wherein said image processing apparatus further comprises a user authentication unit adapted to authenticate a user to use said image processing apparatus,
wherein access control is performed for each function of said image processing apparatus based on an attribute of the user authenticated by said user authentication unit and said access control information notified by said control apparatus.

* * * * *